United States Patent [19]
Sens et al.

[11] Patent Number: 5,616,710
[45] Date of Patent: Apr. 1, 1997

[54] TRIAZOLOPYRIDINE DYES

[75] Inventors: Rüdiger Sens, Mannheim; Ernst Schefczik, Ludwigshafen; Helmut Reichelt, Neustadt; Karl-Heinz Etzbach, Frankenthal, all of Germany

[73] Assignee: BASF Aktiengesellschaft, Ludwigshafen, Germany

[21] Appl. No.: 687,453

[22] PCT Filed: Feb. 15, 1995

[86] PCT No.: PCT/EP95/00564

§ 371 Date: Aug. 19, 1996

§ 102(e) Date: Aug. 19, 1996

[87] PCT Pub. No.: WO95/22581

PCT Pub. Date: Aug. 24, 1995

[30] Foreign Application Priority Data

Feb. 18, 1994 [DE] Germany .......................... 44 05 167.0

[51] Int. Cl.$^6$ .......................... C09B 23/04; C09B 55/00; B41M 5/38
[52] U.S. Cl. .......................... 546/119; 544/127; 8/471; 503/227
[58] Field of Search .......................... 546/119; 8/471; 503/227

[56] References Cited

U.S. PATENT DOCUMENTS

| | | | |
|---|---|---|---|
| 5,079,365 | 1/1992 | Sens et al. | 546/119 |
| 5,147,845 | 9/1992 | Sens et al. | 503/227 |
| 5,376,150 | 12/1994 | Lange et al. | 546/119 X |
| 5,389,596 | 2/1995 | Etzbach et al. | 503/227 |
| 5,489,312 | 2/1996 | Etzbach et al. | 8/471 |

FOREIGN PATENT DOCUMENTS

| | | |
|---|---|---|
| 413226 | 2/1991 | European Pat. Off. . |
| 416434 | 3/1991 | European Pat. Off. . |
| 2305617 | 8/1974 | Germany . |
| 3829918 | 3/1989 | Germany . |

*Primary Examiner*—Fiona T. Powers
*Attorney, Agent, or Firm*—Oblon, Spivak, McClelland, Maier & Neustadt, P.C.

[57] ABSTRACT

Triazolopyridine dyes of the formula

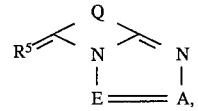

where
one of the two radicals A and E is nitrogen and the other is a radical of the formula C-R$^1$, where R$^1$ is unsubstituted or substituted $C_1$–$C_{20}$-alkyl, unsubstituted or substituted phenyl or unsubstituted or substituted mercapto, Q is a radical of the formula

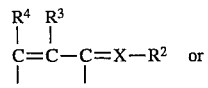

or

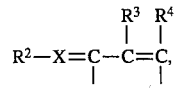

where
R$^2$ is a carbocyclic or heterocyclic radical,
R$^3$ is unsubstituted or substituted $C_1$–$C_4$-alkyl, $C_1$–$C_4$-alkoxycarbonyl or unsubstituted or substituted phenyl,
R$^4$ is cyano, carbamoyl, carboxyl, $C_1$–$C_4$-alkoxycarbonyl or benzothiazolyl or R$^3$ and R$^4$ together are the remainder of a fused-on benzene ring and
X is CH or nitrogen, and
R$^5$ is oxygen or a radical of a compound with an acidic CH, and a process for the thermal transfer of these dyes.

6 Claims, No Drawings

TRIAZOLOPYRIDINE DYES

The present invention relates to novel triazolopyridine dyes of the formula I

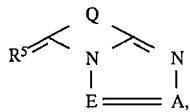

where
A is nitrogen,
E is a radical of the formula C-R$^1$, where R$^1$ is C$_1$–C$_{20}$-alkyl which is unsubstituted or substituted and can be interrupted by 1 to 4 oxygen atoms in ether functionality, unsubstituted or substituted phenyl, mercapto or unsubstituted or substituted C$_1$–C$_{20}$-alkylthiol,
Q is a radical of the formula

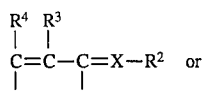

or

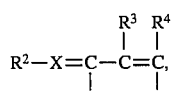

where
R$^2$ is a 5- or 6-membered carbocyclic or heterocyclic radical which can be benzo-fused,
R$^3$ is C$_1$–C$_4$-alkyl which may be interrupted by an oxygen atom in ether functionality, C$_1$–C$_4$-haloalkyl, C$_1$–C$_4$-alkoxycarbonyl or unsubstituted or substituted phenyl,
R$^4$ is cyano, carbamoyl, carboxyl, C$_1$–C$_4$-alkoxycarbonyl or benzothiazolyl or R$^3$ and R$^4$ together are the remainder of a fused-on benzene ring and
X is CH or nitrogen, and
R$^5$ is oxygen or a radical of the formula

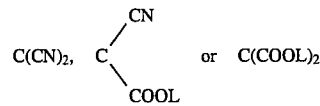

where L is in each case C$_1$–C$_8$-alkyl which may be interrupted by 1 or 2 oxygen atoms in ether functionality,
with the proviso that when
Q is a radical of the formula

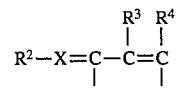

the two radicals A and E may also be mutually interchanged, and to a process for the thermal transfer of these dyes.

U.S. Pat. No. 5,079,365 discloses triazolopyridine dyes which are based on a different ring system.

It is an object of the present invention to provide novel triazolopyridine dyes with a different chemical structure. They should be easy to prepare.

We have found that this object is achieved by the triazolopyridine dyes of the formula I defined at the outset.

The dyes of the formula I may occur in a plurality of tautomeric forms, all of which are embraced by the claims. For example, the compounds with R$^3$=methyl and R$^5$=oxygen may occur in the following tautomeric forms, inter alia:

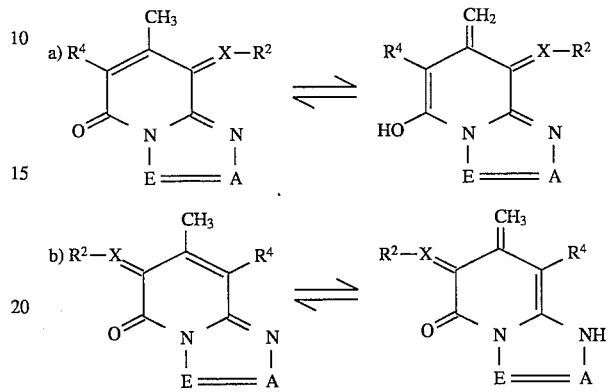

R$^2$ is a 5- or 6-membered carbocyclic or heterocyclic radical which is unsubstituted or substituted and can be benzo-fused.

R$^2$ radicals may be derived, for example, from components from the benzene, indole, quinoline, aminonaphthalene, pyrrole, aminothiazole, benzimidazole, benzothiazole, aminothiophene or diaminopyridine series.

Examples of important R$^2$ radicals are those of the formulae IIa to IIj

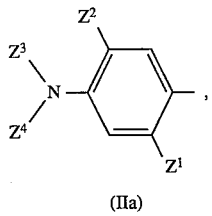

(IIa)

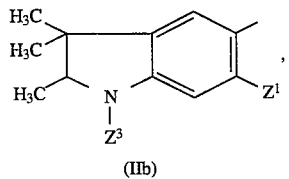

(IIb)

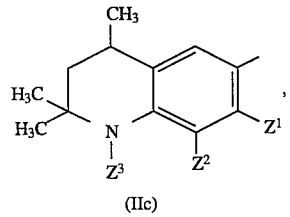

(IIc)

-continued

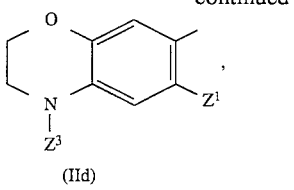
(IId)

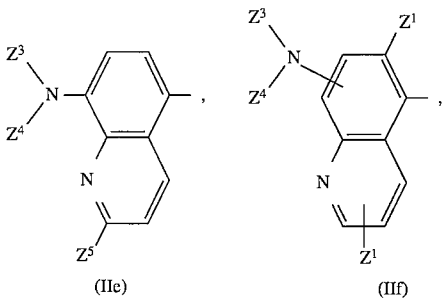
(IIe)   (IIf)

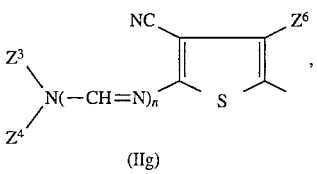
(IIg)

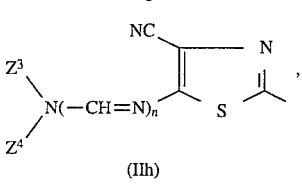
(IIh)

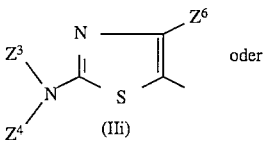
oder
(IIi)

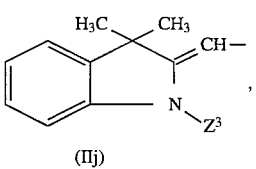
(IIj)

where n is 0 or 1, $Z^1$ is hydrogen, $C_1$–$C_8$-alkyl which may be interrupted by 1 or 2 oxygen atoms in ether functionality, hydroxyl, $C_1$–$C_4$-alkoxy, especially methoxy or ethoxy, formylamino, $C_1$–$C_4$-alkylsulfonylamino, $C_1$–$C_4$-mono- or dialkylaminosulfonylamino or the radical —NHCO$Z^7$ or —NHCO$_2Z^7$ where $Z^7$ is phenyl, benzyl, tolyl or $C_1$–$C_8$-alkyl which may be interrupted by 1 or 2 oxygen atoms in ether functionality, $Z^2$ is hydrogen, $C_1$–$C_4$-alkyl, especially methyl, or $C_1$–$C_4$-alkoxy, especially methoxy or ethoxy, $Z^3$ and $Z^4$ are identical or different and are each, independently of one another, hydrogen, $C_1$–$C_8$-alkyl which is unsubstituted or substituted and may be interrupted by one or two oxygen atoms in ether functionality, $C_3$–$C_4$-alkenyl, $C_5$–$C_7$-cycloalkyl, unsubstituted or substituted phenyl or, together with the nitrogen atom connecting them, a five- or six-membered saturated heterocyclic radical which may contain further hetero atoms, $Z^5$ is hydrogen or $C_1$–$C_4$-alkyl, especially methyl, and $Z^6$ is hydrogen, halogen, $C_1$–$C_8$-alkyl, unsubstituted or substituted phenyl, unsubstituted or substituted benzyl, cyclohexyl, thienyl, hydroxyl, $C_1$–$C_4$-alkoxy, $C_1$–$C_4$-alkylthio or $C_1$–$C_8$-monoalkylamino.

All the alkyl and alkenyl groups occurring in the above mentioned formulae can be either straight-chain or branched.

Examples of suitable substituents in substituted alkyl radicals in the abovementioned formulae are unsubstituted or substituted phenyl, unsubstituted or substituted phenoxy, carboxyl, $C_1$–$C_{20}$-alkoxycarbonyl whose alkyl chain may be interrupted by 1 to 4 oxygen atoms in ether functionality and substituted by phenyl or phenoxy, or cyano, $C_1$–$C_6$-alkanoyloxy, $C_1$–$C_4$alkylaminocarbonyloxy or $C_1$–$C_4$-alkoxycarbonyloxy, where in the latter case the alkoxy group may be substituted by phenyl or $C_1$–$C_4$-alkoxy. Moreover, as a rule, the alkyl radicals have 1 or 2 substituents.

Where the abovementioned formulae contain alkyl radicals which are interrupted by oxygen atoms in ether functionality, the preferred alkyl radicals are interrupted by 1 or 2 oxygen atoms in ether functionality.

Examples of suitable substituents for substituted phenyl radicals in the abovementioned formulae are $C_1$–$C_4$-alkyl, $C_1$–$C_4$-alkoxy, halogen, especially chlorine or bromine, nitro or carboxyl. Moreover, as a rule, the phenyl radicals have 1 to 3 substituents.

Examples of suitable L, $R^1$, $R^3$, $Z^1$, $Z^2$, $Z^3$, $Z^4$, $Z^5$, $Z^6$ and $Z^7$ radicals are methyl, ethyl, propyl, isopropyl, butyl, isobutyl, sec-butyl or tert-butyl.

Further examples of L, $R^1$, $Z^1$, $Z^3$, $Z^4$, $Z^6$ and $Z^7$ radicals are pentyl, isopentyl, neopentyl, tert-pentyl hexyl, 2-methylpentyl, heptyl, octyl, 2-ethylhexyl or isooctyl.

Further examples of $R^1$ radicals are nonyl, isononyl, decyl, isodecyl, undecyl, dodecyl, tridecyl, isotridecyl, tetradecyl, pentadecyl, hexadecyl, heptadecyl, octadecyl, nonadecyl or eicosyl. (The names isooctyl, isononyl, isodecyl and isotridecyl are trivial names derived from the alcohols obtained from the oxo synthesis (cf. in this connection Ullmann's Encyclopedia of Industrial Chemistry, 5th edition, Vol. A1, pages 290 to 293, and Vol. A 10, pages 284 and 285)).

Further examples of L, $R^1$, $Z^1$, $Z^3$, $Z^4$ and $Z^7$ radicals are 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-butoxybutyl 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl or 4,8-dioxadecyl.

Further examples of $R^1$ radicals are 3,6,9-trioxadecyl, 3,6,9-trioxaundecyl, 3,6,9,12-tetraoxatridecyl, 3,6,9,12-tetraoxatetradecyl, methylthio, ethylthio, propylthio, isopropylthio, butylthio, isobutylthio, sec-butylthio, pentylthio, isopentylthio, neopentylthio, tert-pentylthio, hexylthio, heptylthio, 1-ethylpentylthio, octylthio, isooctylthio, 2-ethylhexylthio, nonylthio, isononylthio, decylthio, isodecylthio, undecylthio, dodecylthio, tridecylthio, isotridecylthio, tetradecylthio, pentadecylthio, hexadecylthio, heptadecylthio, octadecylthio, nonadecylthio or eicosylthio.

Further examples of $R^1$, $R^3$, $Z^3$, $Z^4$ and $Z^6$ radicals are phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-chlorophenyl, 2-, 3- or 4-nitrophenyl or 2-, 3- or 4-carboxyphenyl.

Further examples of $R^1$, $Z^3$ and $Z^4$ radicals are 2-carboxyethyl, 2-methoxycarbonylethyl, benzyl, 1- or 2-phenylethyl, 2-, 3- or 4-methylbenzyl, 2-, 3- or 4-methoxybenzyl, 2-, 3- or 4-chlorobenzyl, 2-, 3- or 4-nitrobenzyl, 3-benzyloxypropyl, phenoxymethyl, 6-phenoxy-4-oxahexyl, 8-phenoxy-4-oxaoctyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2or 3-ethoxycarbonylpropyl, 2-methylaminocarbonyloxyethyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl or 2- or 3-(2-ethoxyethoxycarbonyloxy)propyl.

Further examples of $Z^3$ and $Z^4$ radicals are cyclopentyl, cyclohexyl, cycloheptyl, allyl or methallyl.

Examples of $Z^1$ radicals are methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono-, or dipropylaminosulfonylamino, monoor diisopropylaminosulfonylamino, mono- or dibutylaminosulfonylamino or (N-methyl-N-ethylaminosulfonyl)amino.

Further examples of $Z^6$ radicals are fluorine, chlorine, bromine, benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino, 2-ethylhexylamino, methylthio, ethylthio, propylthio, isopropylthio or butylthio.

Further examples of $Z^1$, $Z^2$ and $Z^6$ radicals are methoxy, ethoxy, propoxy, isopropoxy, butoxy, isobutoxy, sec-butoxy or tertbutoxy.

When $Z^3$ and $Z^4$ together with the nitrogen atom connecting them form a five- or six-membered saturated heterocyclic radical which may have further hetero atoms, suitable examples thereof are pyrrolidinyl, piperidinyl, morpholinyl, piperazinyl or N—($C_1$–$C_4$-alkyl)piperazinyl.

Examples of $R^4$ radicals are methoxycarbonyl, ethoxycarbonyl, propoxycarbonyl, isopropoxycarbonyl, butoxycarbonyl, isobutoxycarbonyl or sec-butoxycarbonyl.

Further examples of $R^3$ radicals are methoxymethyl, ethoxymethyl, 2-methoxyethyl, 2-ethoxyethyl, methoxycarbonyl, ethoxycarbonyl, propoxycarbonyl, butoxycarbonyl, fluoromethyl, chloromethyl, difluoromethyl, dichloromethyl, trifluoromethyl, trichloromethyl, 2-fluoroethyl, 2-chloroethyl, 2,2,2-trifluoroethyl, pentafluoroethyl or heptafluoropropyl.

Preferred triazolopyridine dyes of the formula I are those where $R^4$ is cyano.

Further preferred triazolopyridine dyes of the formula I are those where $R^3$ is $C_1$–$C_4$-alkyl, especially methyl.

Further preferred triazolopyridine dyes of the formula I are those where $R^1$ is $C_1$–$C_{12}$-alkyl which is unsubstituted or substituted by $C_1$–$C_6$-alkanoyloxy, $C_1$–$C_8$-alkoxycarbonyl whose alkyl chain can be interrupted by 1 or 2 oxygen atoms in ether functionality, phenyl or $C_1$–$C_4$-alkylphenyl, and which can be interrupted by 1 or 2 oxygen atoms in ether functionality, or unsubstituted or substituted phenyl.

Particularly preferred triazolopyridine dyes of the formula I are those where $R^1$ is alkyl, alkoxyalkyl, alkanoyloxyalkyl or alkoxycarbonylalkyl, each of these radicals having up to 12 carbon atoms, unsubstituted or methyl-substituted benzyl or unsubstituted or methyl-substituted phenyl.

Further particularly preferred triazolopyridine dyes of the formula I are those where $R^2$ is a radical of the abovementioned formula IIa, IIc or IIi, where $Z^1$ is hydrogen, $C_1$–$C_4$-alkyl, $C_1$–$C_4$-alkoxy or $C_1$–$C_8$-alkanoylamino, $Z^2$ is hydrogen, methyl, methoxy or ethoxy, $Z^3$ and $Z^4$ are each, independently of one another, alkyl, alkoxyalkyl, alkanoyloxyalkyl or alkoxycarbonylalkyl, each of these radicals having up to 12 carbon atoms, hydrogen, unsubstituted or methyl-substituted benzyl or phenyl and $Z^6$is hydrogen, $C_1$–$C_8$-alkyl, unsubstituted or $C_1$–$C_4$-alkyl- or $C_1$–$C_4$-alkoxy-substituted phenyl, benzyl or thienyl.

The dyes of the formula I according to the invention can be prepared by conventional methods.

For example, those triazolopyridine dyes of the formula I where X is CH can be obtained by condensing aldehydes of the formula III

$R^2$—CHO                                                        (III), where $R^2$ has the abovementioned meaning, with triazolopyridines of the formula IVa, IVb or IVc

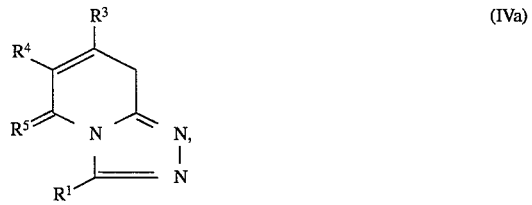

(IVa)

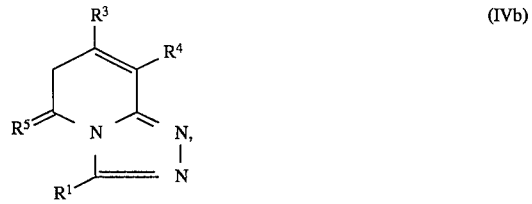

(IVb)

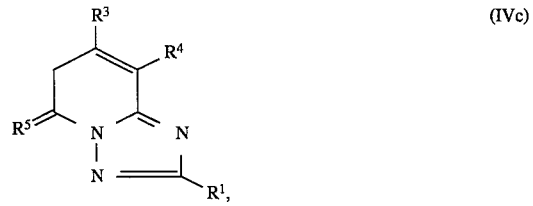

(IVc)

where $R^1$, $R^3$, $R^4$ and $R^5$ each have the abovementioned meanings.

Those triazolopyridine dyes of the formula I where X is nitrogen can be obtained, for example, by condensing nitroso compounds of the formula V

$R^2$—NO                                                       (V), where $R^2$ has the abovementioned meaning, or by oxidative coupling of amino compounds of the formula VI

$R^2$—$NH^2$                                               (VI), where $R^2$ has the abovementioned meaning, with the triazolopyridines IVa, IVb or IVc.

However, it is also possible to condense the triazolopyridines of the formula IVd, IVe, IVf, IVg, IVh or IVi

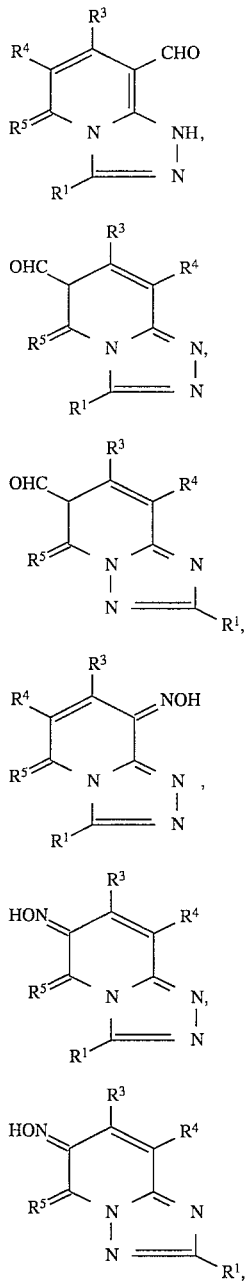

where $R^1$, $R^3$ $R^4$ and $R^5$ each have the abovementioned meanings, with compounds of the formula VII $$R^2\text{—H} \quad (VII),$$

where $R^2$ has the abovementioned meaning, in accordance with the process described in the earlier German Patent Application P 44 03 083.5.

The triazolopyridines of the formula IV are described, for example, in the earlier Patent Application PCT/EP 94/02233 or in U.S. Pat. No. 5,101,028, or they can be obtained by the methods mentioned therein or else in the earlier German Patent Application P 44 03 083.5.

The present invention further relates to a process for transferring dyes from a carrier to a plastic-coated paper by diffusion or sublimation with the aid of an energy source, wherein a carrier on which there are one or more triazolopyridine dyes of the formula I is used.

To prepare the dye carriers required for the process according to the invention, the dyes of the formula I are processed in a suitable organic solvent or in mixtures of solvents with one or more binders, with or without the addition of auxiliaries, to a printing ink. The latter preferably contains the dyes of the formula I in the form of a molecular disperse solution. The printing ink can be applied by means of a knife to the inert carrier, and the dye can be dried, for example, in the air or with an air blower. Examples of suitable organic solvents for the dyes of the formula I are those in which the solubility of the dyes of the formula I is more than 1% by weight, preferably more than 5% by weight, at 20° C.

Examples which may be mentioned are ethanol, propanol, isobutanol, tetrahydrofuran, methylene chloride, methyl ethyl ketone, cyclopentanone, cyclohexanone, toluene, chlorobenzene or mixtures thereof.

Suitable binders are all resins or polymeric materials which are soluble in organic solvents and which are able to bind the dye mixtures to the inert carrier in a manner resistant to abrasion. The binders preferred for this are those which take up the dye mixture in the form of a clear transparent film after the printing ink has dried in the air, without visible crystallization of the dye mixture occurring.

Examples of such binders are mentioned in U.S. Pat. No. 5,132,438 or the relevant patent applications cited therein. Mention may also be made of saturated linear polyesters.

Preferred binders are ethylcellulose, ethylhydroxyethylcellulose, polyvinylbutyral, polyvinyl acetate, cellulose propionate or saturated linear polyesters.

The binder: dye ratio by weight is generally from 1:1 to 10:1.

Examples of suitable auxiliaries are release agents as mentioned in U.S. Pat. No. 5,132,438 or the relevant patent applications cited therein. In addition, particular mention should be made of organic additives which prevent the transfer dyes crystallizing out on storage or on heating of the ink ribbon, eg. cholesterol or vanillin.

Examples of suitable inert carriers are described in U.S. Pat. No. 5,132,438 or the relevant patent applications cited therein. The thickness of the dye carrier is generally from 3 to 30 μm.

Suitable as dye recipient layer are in principle all temperature-stable plastic layers with affinity for the dyes to be transferred, for example modified polycarbonates or polyesters.

Further details of this may be found, for example, in U.S. Pat. No. 5,132,438 or the relevant patent applications cited therein.

The transfer takes place by means of an energy source, for example by means of a laser or a thermal head, it being necessary that the latter be heatable to ≧300° C. so that the dye transfer can take place in a time in the range 0<t<15 msec. During this, the dye migrates out of the transfer sheet and diffuses into the surface coating of the recipient medium.

The dyes of the formula I according to the invention have advantageous technical properties in the transfer thereof. They display a high solubility in the ink ribbon (good compatibility with the binder), a high stability in the printing ink, a good transferability, a high image stability (ie. good fastness to light and good stability to environmental effects, eg. moisture, temperature or chemicals) and permit flexible color adaptation to preexistent subtractive primary colors in the sense of optimal trichromatic printing (maximum possible brilliance of primary or mixed colors and deep neutral black).

The dyes of the formula I according to the invention are furthermore suitable and advantageous for dyeing synthetic materials, eg. polyesters, polyamides or polycarbonates. Particular mention should be made of materials in textile form, such as fibers, yarns, plied yarns, knitted fabrics, wovens or nonwovens made of polyester or polyamide or polyester/cotton blends.

The novel dyes of the formula I are furthermore suitable and advantageous for producing color filters as described, for example, in EP-A 399 473.

Finally, they can also be used advantageously as colorants for producing toners for electrophotography.

The following examples illustrate the invention.

A) Preparation

EXAMPLE 1

17.8 g of 2-dibutylamino-4-phenyl-5-formylthiazole and 10.8 g of triazolopyridone of the formula

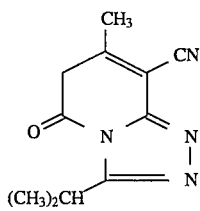

were added to 30 ml of acetic anhydride. The mixture was refluxed for 5 min and then cooled to room temperature. The resulting dye of the formula

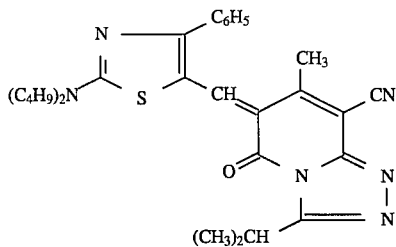

was filtered off with suction, washed with methanol and dried. (yield: 20.9 g; $\lambda_{max}$ in $CH_2Cl_2$:561 nm; m.p.: 202° C.)

EXAMPLE 2

9.6 g of 3-methyl-N-butyl-N-ethylaniline were dissolved in 50 ml of water and 25 ml of concentrated hydrochloric acid and cooled to 0°–5° C. 20 ml of 23% by weight aqueous sodium nitrite solution were added dropwise to this, and the mixture was stirred at 0°–5° C. for 2 h.

The nitroso compound obtained in this way was adjusted to pH 8 with 25% by weight of aqueous ammonia and was extracted by shaking with ethyl acetate.

The organic phase was run into a mixture of 14.7 g of the triazolopyridone mentioned in Example 1 and 30 ml of acetic anhydride. Ethyl acetate was then distilled out until the internal temperature reached 100° C. The mixture was then cooled to room temperature. The resulting precipitate was filtered off with suction, washed with methanol and dried to afford 14.9 g of the dye of the formula

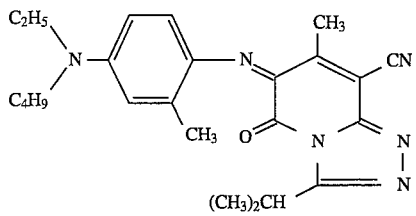

($\lambda_{max}$ in $CH_2Cl_2$:676 nm, in tetrahydrofuran (THF): 661 nm)

EXAMPLE 3

9.8 g of 2-dibutylamino-4-phenyl-5-formylthiazole and 10.8 g of triazolopyridone of the formula

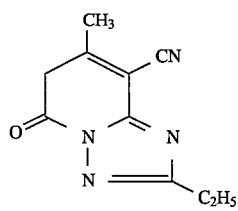

were added to 25 ml of acetic anhydride. The mixture was refluxed for 15 min and then cooled to room temperature. The resulting dye of the formula

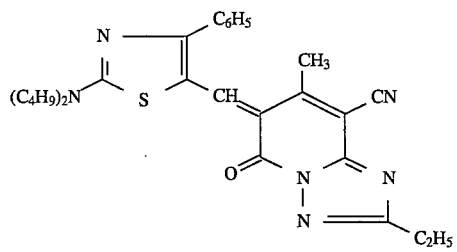

was filtered off with suction, washed with methanol and dried. (Yield: 9.3 g; $\lambda_{max}$ in THF: 563 nm; m.p. 212° C.)

EXAMPLE 4

5.8 g of 3-diethylamino-N-acetylaniline were dissolved in 100 ml of concentrated hydrochloric acid and cooled to 0°–5° C. 9 ml of 23% by weight aqueous sodium nitrite solution were added dropwise to this, and the mixture was stirred at 0°–5° C. for 2 h.

The nitroso compound obtained in this way was adjusted to pH 8 with 25% by weight aqueous ammonia and extracted by shaking with ethyl acetate.

The organic phase was concentrated, taken up in 350 ml of methanol and mixed with 5 g of Raney nickel. Hydrogen was then injected. After uptake of hydrogen ceased, the catalyst was filtered off and the solution was concentrated.

The resulting concentrated solution was added to a mixture of 6.6 g of the triazolopyridone of the formula

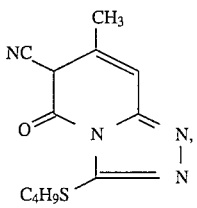

50 ml of ethanol and 50 ml of ethyl acetate.

To this mixture were added initially a solution of 4.1 g of sodium acetate (anhydrous) in 50 ml of water and subsequently, dropwise, a solution of 5.7 g of ammonium peroxodisulfate in 50 ml of water. The mixture was stirred at room temperature for 1 h and then the product was filtered off with suction, washed with ethanol and water and dried to afford 5.22 g of the dye of the formula

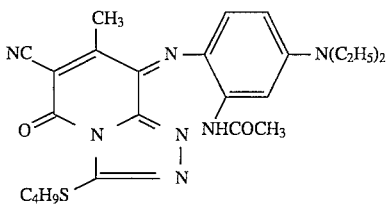

($\lambda_{max}$ in $CH_2Cl_2$:647 nm, in THF: 636 nm; m.p.: 201° C.)

EXAMPLE 5 a) 40.8 g of the compound of the formula

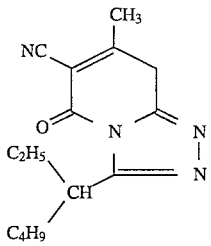

were dissolved in 900 ml of glacial acetic acid at 100° C. The solution was cooled to 50° C., and 480 ml of conc. hydrochloric acid were added. Then, at 0° to 5° C., 48 ml of 23% by weight aqueous sodium nitrite solution were added dropwise, and the mixture was stirred at 0° to 5° C. for 3 h. It was subsequently discharged into 3 l of water, and the product was filtered off with suction, washed with water and dried to afford 40.8 g of substance of the formula

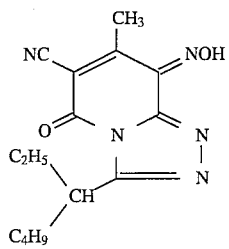

b) 8.3 g of 86.5% by weight 2-(di-sec-butylamino)-4-phenylthiazole and 7,5 g of the compound described in a) were refluxed in 10 ml of glacial acetic acid and 10 ml of propionic acid for 15 min. After cooling, the reaction mixture was purified on silica gel (mobile phase: toluene/ethyl acetate 2:2 v/v) to afford 7.53 g of dye of the formula

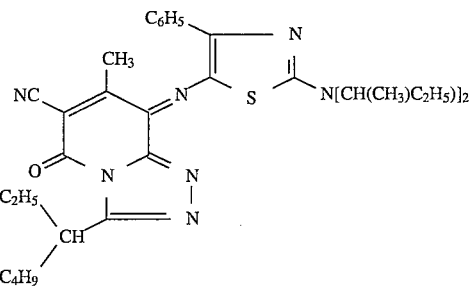

($\lambda_{max}$ in THF: 617 nm; m.p.: 165° C.)

The dyes listed hereinafter were obtained in a similar way to the previous examples.

TABLE 1

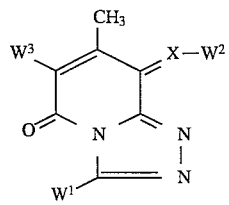

| Example No. | $W^1$ | $W^2$ | X | $W^3$ | $\lambda max$ [nm] (in $CH_2Cl_2$) |
|---|---|---|---|---|---|
| 6 | $(CH_3)_3C(CH_2)_5$ | (structure) | CH | CN | 576 |

TABLE 1-continued

[Structure: pyridone core with substituents W³, CH₃, X-W², =O, N, N=N, W¹]

| Example No. | W¹ | W² | X | W³ | λmax [nm] (in CH₂Cl₂) |
|---|---|---|---|---|---|
| 7 | (CH₃)₃C(CH₂)₅ | (i-C₃H₇)₂N-C(=N-)-S-C(=C(CH₃)-)-C₆H₅ | N | CN | 618 |
| 8 | C₄H₉(C₂H₅)CHCH₂S | 2-(2-methyl-3-methylindolin-3,3-dimethyl)=CH- | CH | CN | 578 |
| 9 | C₄H₉S | (C₂H₅)(C₄H₉)N-C(=N-)-S-C(=C(CH₃)-)-C₆H₅ | CH | CN | 560 |
| 10 | C₄H₉(C₂H₅)CH | (C₂H₅)₂N-C(=N-)-S-C(=C(CH₃)-)-C₆H₅ | CH | CN | 576 |
| 11 | C₄H₉S | (C₂H₅)₂N-C₆H₄- | N | CN | 627 |
| 12 | C₄H₉(C₂H₅)CH | (C₂H₅)₂N-C₆H₄- | N | CN | 610 |
| 13 | C₄H₉(C₂H₅)CH | (C₂H₅)₂N-, CH₃COHN- substituted phenyl | N | CN | 631 |
| 14 | (CH₃)₂CH | (C₂H₅)₂N-C(=N-)-S-C(=C(CH₃)-)-(2-thienyl) | CH | benzothiazol-2-yl-methylidene | 584 (in DMF) |
| 15 | (CH₃)₂CH | 2-(N-methylindolin-3,3-dimethyl)=CH- | CH | benzothiazol-2-yl-methylidene | 548 (in DMF) |
| 16 | C₄H₉(C₂H₅)CH | (C₄H₉)₂N-C(=N-)-S-C(=C(CH₃)-)-C₆H₅ | CH | CN | 580 |

TABLE 1-continued $$\text{Structure with } W^3, CH_3, X-W^2, O, N, N, W^1$$

| Example No. | W¹ | W² | X | W³ | λmax [nm] (in CH₂Cl₂) |
|---|---|---|---|---|---|
| 17 | C₄H₉(C₂H₅)CH | (C₄H₉)₂N–C(=N–)–S– attached to C(C₆H₅)=C(CH₃)– | N | CN | 618 |
| 18 | C₄H₉(C₂H₅)CH | (C₃H₇)₂N–C(=N–)–S– attached to C(C₆H₅)=C(CH₃)– | N | CN | 617 |
| 19 | C₄H₉(C₂H₅)CH | [(CH₃)₂CH]₂N–C(=N–)–S– attached to C(C₆H₅)=C(CH₃)– | N | CN | 618 |
| 20 | C₄H₉(C₂H₅)CH | (C₂H₅)₂N– and C₂H₅COHN– substituted phenyl | N | CN | 629 |
| 21 | C₄H₉ | (C₄H₉)₂N–C(=N–)–S– attached to C(C₆H₅)=C(CH₃)– | CH | CN | 578 |
| 22 | C₄H₉(C₂H₅)CH | (C₄H₉)₂N–C(=N–)–S– attached to C(C(CH₃)₃)=C(CH₃)– | CH | CN | 573 |
| 23 | C₄H₉(C₂H₅)CH | (C₄H₉)₂N–C(=N–)–S– attached to C(C₆H₅)=C(CH₃)– | N | CN | 617 |
| 24 | C₄H₉ | (C₄H₉)₂N–C(=N–)–S– attached to C(C₆H₅)=C(CH₃)– | N | CN | 617 |
| 25 | C₄H₉ | [(CH₃)₂CHCH₂]₂N–C(=N–)–S– attached to C(C₆H₅)=C(CH₃)– | CH | CN | 577 |
| 26 | C₄H₉ | [(CH₃)₂CHCH₂]₂N–C(=N–)–S– attached to C(C₆H₅)=C(CH₃)– | N | CN | 618 |
| 27 | C₄H₉ | [(C₂H₅)(CH₃)CH]₂N–C(=N–)–S– attached to C(C₆H₅)=C(CH₃)– | N | CN | 620 |

TABLE 1-continued

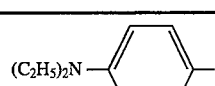

| Example No. | W¹ | W² | X | W³ | λmax [nm] (in $CH_2Cl_2$) |
|---|---|---|---|---|---|
| 28 | $C_4H_9(C_2H_5)CH$ | 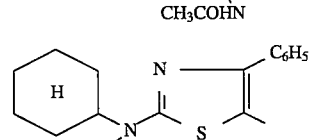 [$(C_2H_5(CH_3)CH]_2N$, with $C_6H_5$, $N$, $S$ | N | CN | 620 |
| 29 | $C_4H_9$ | 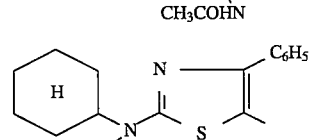 [$(C_2H_5(CH_3)CH]_2N$, with $C_6H_5$, $N$, $S$ | CH | CN | 580 |
| 30 | $C_4H_9(C_2H_5)CH$ | 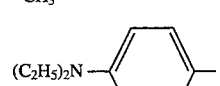 NC, $C_6H_5$, $(C_4H_9)_2N$, $S$ | N | CN | 625 (in THF) |

TABLE 2

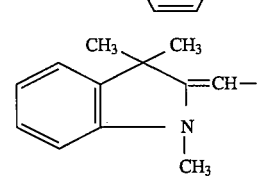

| Ex. No. | W¹ | W² | W³ | W⁴ | X | λmax [nm] (in $CH_2Cl_2$) |
|---|---|---|---|---|---|---|
| 31 | $(CH_3)_2CH$ | 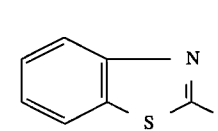 $(C_2H_5)_2N-$, $CH_3COHN$ | $CH_3$ | CN | N | 622 |
| 32 | $C_2H_5$ | cyclohexyl-N(CH₃)-C(=S)-N= with $C_6H_5$ | $CH_3$ | CN | CH | 619 (in DMF) |
| 33 | $C_2H_5$ | $(C_2H_5)_2N-C_6H_4-$ | $CH_3$ | CN | N | 622 (in DMF) |
| 34 | $(CH_3)_2CH$ | indoline derivative (=CH—) | $CH_3$ | benzothiazole-2-yl | CH | 522 |

TABLE 2-continued

[Structure: pyridone ring with substituents W²-X, W³, W⁴ and N-N=CH-W¹]

| Ex. No. | W¹ | W² | W³ | W⁴ | X | λmax [nm] (in CH₂Cl₂) |
|---|---|---|---|---|---|---|
| 35 | $(CH_3)_2CH$ | $(C_4H_9)_2N-C(=S)-N=C(C_6H_5)-C(CH_3)=$ | $CF_3$ | CN | CH | 566 |
| 36 | $(CH_3)_2CH$ | $(C_4H_9)_2N-C(=S)-N=C(C(CH_3)_3)-C(CH_3)=$ | $CH_3$ | CN | CH | 556 |
| 37 | $(CH_3)_2CH$ | $[C_2H_5(CH_3)CH]_2N-C(=S)-N=C(C(CH_3)_3)-C(CH_3)=$ | $CH_3$ | CN | CH | 558 |
| 38 | $(CH_3)_2CH$ | $[(CH_3)_2CHCH_2]_2N-C(=S)-N=C(C(CH_3)_3)-C(CH_3)=$ | $CH_3$ | CN | CH | 557 |
| 39 | $CH_3O-C_6H_4-CH_2$ | $(C_4H_9)_2N-C(=S)-N=C(C_6H_5)-C(CH_3)=$ | $CH_3$ | CN | CH | 566 |
| 40 | $Cl-C_6H_4-CH_2$ | $(C_4H_9)_2N-C(=S)-N=C(C_6H_5)-C(CH_3)=$ | $CH_3$ | CN | CH | 566 |
| 41 | $O_2N-C_6H_4-CH_2$ | $(C_4H_9)_2N-C(=S)-N=C(C_6H_5)-C(CH_3)=$ | $CH_3$ | CN | CH | 566 |
| 42 | $CH_3O-C_6H_4-CH_2$ | $(C_4H_9)_2N-C(=S)-N=C(C_6H_5)-C(CH_3)=$ | $CH_3$ | CN | N | 625 |
| 43 | $CH_3OC_2H_4$ | $(C_4H_9)_2N-C(=S)-N=C(C_6H_5)-C(CH_3)=$ | $CH_3$ | CN | CH | 564 |
| 44 | $CH_3OC_2H_4$ | $(C_4H_9)_2N-C(=S)-N=C(C_6H_5)-C(CH_3)=$ | $CH_3$ | CN | N | 625 |
| 45 | $(CH_3)_2CH$ | $[(CH_3)_2CH]_2N-C(=S)-N=C(C_6H_5)-C(CH_3)=$ | $CF_3$ | CN | CH | 555 |

TABLE 2-continued

| Ex. No. | W¹ | W² | W³ | W⁴ | X | λmax [nm] (in CH₂Cl₂) |
|---|---|---|---|---|---|---|
| 46 | O₂N-C₆H₄-CH₂ | (C₄H₉)₂N-C(=S)-N=C(C₆H₅)- | CH₃ | CN | N | 628 |
| 47 | 3-Cl-C₆H₄-CH₂ | (C₄H₉)₂N-C(=S)-N=C(C₆H₅)- | CH₃ | CN | N | 628 |
| 48 | (CH₃)₂CH | [(CH₃)₂CH]₂N-C(=S)-N=C(C(CH₃)₃)- | CF₃ | CN | CH | 560 |
| 49 | CH₃OC₂H₄ | (C₄H₉)₂N-C(=C(CN))-S-C(C₆H₅)= | CH₃ | CN | N | 631 (in THF) |
| 50 | CH₃OC₂H₄ | (C₄H₉)₂N-C(=C(CN))-S-C(C₆H₅)= | CH₃ | CN | CH | 575 (in THF) |
| 51 | (CH₃)₂CH | (C₄H₉)₂N-C(=C(CN))-S-C(C₆H₅)= | CF₃ | CN | CH | 584 (in THF) |

TABLE 3

| Ex. No. | W¹ | W² | X | λmax [nm] (in CH₂Cl₂) |
|---|---|---|---|---|
| 52 | C₆H₅ | (C₂H₅)₂N-C₆H₄- | CH | 566 |
| 53 | C₂H₅ | (C₂H₅)₂N-C₆H₄- | N | 618 |

TABLE 3-continued

[Structure: pyridone dye with CH₃, CN, W²—X, and N—N=W¹ substituents]

| Ex. No. | W¹ | W² | X | λmax [nm] (in CH₂Cl₂) |
|---|---|---|---|---|
| 54 | C₆H₅ | [2-(dimethylamino-methylidene)-α,α-dimethylbenzyl group: CH₃, CH₃, =CH—, N—CH₃] | CH | 542 |
| 55 | C₆H₅ | [(C₂H₅)₂N—C(=S)—N=C(C₆H₅)—] thiazole derivative | N | 624 (in DMF) |
| 56 | C₆H₅ | (C₂H₅)₂N—C₆H₄— | N | 618 |
| 57 | C₂H₅ | [(C₄H₉)₂N—C(=S)—N=C(C(CH₃)₃)—] | CH | 556 |
| 58 | C₂H₅ | [[C₂H₅(CH₃)CH]₂N—C(=S)—N=C(C(CH₃)₃)—] | CH | 559 |

B) Dye transfer

General method a) 10 g of dye are stirred, where appropriate with brief heating to 80°–90° C., into 100 g of a 10% by weight solution of a binder in a methyl ethyl ketone/toluene/cyclohexanone mixture (4.5:2:2 v/v/v).

The printing ink is applied with a 6 μm knife to a polyester sheet 6 μm thick on whose reverse side a suitable nonstick layer has been applied, and dried with an air blower for 1 minute. Before the ink ribbon can be used for printing it must dry in the air for at least 24 hours because residual solvents may impair the printing process.

b) The ink ribbons are used for printing on commercial video-print paper (Hitachi type VY-S) in a computer-controlled test arrangement equipped with a commercial thermal head.

The energy output of the thermal head is controlled by altering the voltage, the pulse duration being set at 7 ms and only one pulse being delivered each time. The energy output is from 0.7 to 2.0 mJ/dot.

Since the level of coloration is directly proportional to the energy supplied, a color wedge can be produced and analyzed spectroscopically.

The Q* (energy in mJ for an extinction of 1) and the gradient m in 1/mJ are found from the graph of the depth of color against the energy supplied per heating element.

The results are listed in the following Table 4.

(In the data for Q* and m, the first value relates in each case to a polyester-based binder and the second relates in each case to a polyvinylbutyral-based binder.)

TABLE 4

| Dye No. | Q* [mJ/Dot] | m [1/mJ] |
|---|---|---|
| 1 | 0.93 | 2.48 |
| 2 | 1.31 | 1.48 |
|   | — | — |
| 3 | 0.96 | 2.42 |
|   | 1.03 | 2.07 |
| 6 | 1.34 | 1.34 |
|   | 1.34 | 1.34 |
| 7 | 1.20 | 1.54 |
|   | 1.26 | 1.51 |
| 8 | 1.25 | 1.43 |
|   | 1.34 | 1.45 |
| 9 | — | — |
|   | 1.03 | 2.06 |
| 10 | — | — |
|   | 1.07 | 1.83 |
| 11 | — | — |
|   | 1.38 | 1.33 |
| 12 | — | — |
|   | 1.69 | 0.95 |
| 16 | 0.94 | 2.55 |
|   | 0.99 | 2.17 |
| 17 | 0.95 | 2.30 |
|   | 1.01 | 2.04 |
| 18 | 0.97 | 2.34 |
|   | 1.06 | 1.90 |
| 19 | 1.03 | 2.16 |

TABLE 4-continued

| Dye No. | Q* [mJ/Dot] | m [1/mJ] |
|---|---|---|
|  | 1.06 | 1.96 |
| 21 | 1.14 | 1.73 |
|  | 1.22 | 1.58 |
| 23 | 0.94 | 2.76 |
|  | 0.95 | 2.26 |
| 24 | 1.03 | 2.22 |
|  | 1.19 | 1.81 |
| 26 | 1.01 | 1.96 |
|  | 1.03 | 1.87 |
| 27 | 0.99 | 2.08 |
|  | 1.05 | 1.84 |
| 28 | 0.91 | 2.60 |
|  | 1.00 | 2.05 |
| 29 | 1.01 | 2.09 |
|  | 1.01 | 2.02 |
| 31 | 1.01 | 1.85 |
|  | 1.20 | 1.58 |
| 35 | 0.97 | 2.67 |
|  | 1.06 | 2.05 |
| 36 | 0.85 | 3.40 |
|  | 0.93 | 2.55 |
| 37 | 0.88 | 3.08 |
|  | 0.97 | 2.37 |
| 38 | 0.87 | 3.81 |
|  | 0.94 | 2.54 |
| 40 | 1.10 | 1.87 |
|  | 1.17 | 1.71 |
| 42 | 1.30 | 1.34 |
|  | 1.28 | 1.34 |
| 43 | 1.00 | 2.17 |
|  | 1.14 | 1.71 |
| 44 | 1.12 | 1.68 |
|  | 1.21 | 1.54 |
| 45 | 0.88 | 3.11 |
|  | 0.98 | 2.27 |
| 47 | 1.22 | 1.42 |
|  | 1.25 | 1.42 |
| 57 | 0.94 | 2.84 |
|  | 0.94 | 2.42 |
| 58 | 0.85 | 3.36 |
|  | 0.95 | 2.48 | c) Use for dyeing 10 g of polyester fabric are added at 50° C. to 200 ml of a dyeing liquor which contains X % by weight, based on the polyester fabric, of dye and whose pH is adjusted to 4.5 with acetic acid. After treatment at 50° C. for 5 min, the temperature of the liquor is raised to 130° C. over the course of 30 min, and this temperature is maintained for 60 min and then cooled to 60° C. over the course of 20 min. The dyed polyester fabric is then reductively cleaned by treating it in 200 ml of a liquor which contains 5 ml/l 32% by weight sodium hydroxide solution, 3 g/l sodium dithionite and 1 g/l of an adduct of 48 mol of ethylene oxide and 1 mol of castor oil at 65° C. for 15 min. Finally, the fabric is rinsed, neutralized with dilute acetic acid, rinsed again and dried.

Dyes 5, 7, 17 and 27 were each used in an amount (X) of 0.25 % by weight. In each case greenish blue dyeings of high brilliance and excellent fastness to sublimation were obtained.

Dyes 1, 10 and 21 were each used in an amount (X) of 0.35 % by weight. In each case violet dyeings with good performance properties were obtained.

We claim:

1. A triazolopyridine dye of the formula I

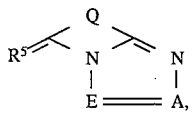

where

A is nitrogen,

E is a radical of the formula C-R$^1$, where R$^1$ is C$_1$-C$_{20}$-alkyl which is unsubstituted or substituted and may be interrupted by 1 to 4 oxygen atoms in ether functionality, unsubstituted or substituted phenyl, mercapto or unsubstituted or substituted C$_1$-C$_{20}$-alkylthio, Q is a radical of the formula

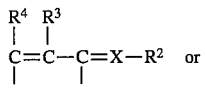

or

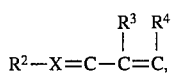

where

R$^2$ is a 5- or 6-membered carbocyclic or heterocyclic radical which may be benzo-fused, R$^3$ is C$_1$-C$_4$-alkyl which may be interrupted by an oxygen atom in ether functionality, C$_1$-C$_4$-haloalkyl, C$_1$-C$_4$-alkoxycarbonyl or unsubstituted or substituted phenyl, R$^4$ is cyano, carbamoyl, carboxyl, C$_1$-C$_4$-alkoxycarbonyl or benzothiazolyl or R$^3$ and R$^4$ together are the remainder of a fused-on benzene ring and X is CH or nitrogen, and R$^5$ is oxygen or a radical of the formula

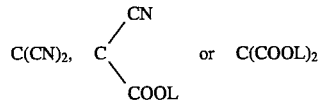

where L is in each case C$_1$-C$_8$-alkyl which may be interrupted by 1 or 2 oxygen atoms in ether functionality, or unsubstituted or substituted phenyl, with the proviso that when Q is a radical of the formula

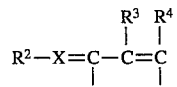

the two radicals A and E may also be mutually interchanged.

2. A triazolopyridine dye as claimed in claim 1, wherein R$^4$ is cyano.

3. A triazolopyridine dye as claimed in claim 1, wherein R$^3$ is C$_1$-C$_4$-alkyl.

4. A triazolopyridine dye as claimed in claim 1, wherein R$^1$ is C$_1$-C$_{12}$-alkyl which is unsubstituted or substituted by C$_1$-C$_6$-alkanoyloxy, C$_1$-C$_8$-alkoxycarbonyl whose alkyl chain can be interrupted by 1 or 2 oxygen atoms in ether functionality, phenyl or C$_1$-C$_4$-alkylphenyl, and which may be interrupted by 1 or 2 oxygen atoms in ether functionality, or unsubstituted or substituted phenyl.

5. A triazolopyridine dye as claimed in claim 1, wherein R$^2$ is derived from a component from the benzene, indole, quinoline, aminonaphthalene, pyrrole, aminothiazole, benzimidazole, benzothiazole, aminothiophene or diaminopyridine series.

6. A process for transferring dyes from a carrier to a plastic-coated paper by diffusion or sublimation with the aid of an energy source, wherein a carrier on which there are one or more triazolopyridine dyes of the formula I as claimed in claim 1 is used.

\* \* \* \* \*